(12) United States Patent
Chapalamadugu et al.

(10) Patent No.: US 8,335,844 B2
(45) Date of Patent: Dec. 18, 2012

(54) SYSTEM AND METHOD OF PROVIDING QUALITY OF SERVICE-ENABLED CONTENTS IN PEER-TO-PEER NETWORKS

(75) Inventors: Akhil Chapalamadugu, Suwon-si (KR); Sang-kwon Lee, Suwon-si (KR); Guanhua Zhang, Suwon-si (KR); Hyok-Sung Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 11/872,181

(22) Filed: Oct. 15, 2007

(65) Prior Publication Data

US 2008/0208976 A1    Aug. 28, 2008

(30) Foreign Application Priority Data

Feb. 28, 2007    (KR) .................. 10-2007-0020584

(51) Int. Cl.
*G06F 15/173*    (2006.01)
(52) U.S. Cl. ........ 709/223; 709/205; 709/231; 709/228; 370/254; 370/390
(58) Field of Classification Search ................. 709/223
See application file for complete search history.

(56) References Cited

U.S. PATENT DOCUMENTS

| | | | | |
|---|---|---|---|---|
| 7,633,887 | B2 * | 12/2009 | Panwar et al. ............. | 370/254 |
| 7,986,637 | B2 * | 7/2011 | Panwar et al. ............. | 370/254 |
| 2004/0107293 | A1 | 6/2004 | Okura | |
| 2005/0025136 | A1 * | 2/2005 | Anschutz et al. ............ | 370/352 |
| 2006/0206486 | A1 * | 9/2006 | Strickland ..................... | 707/9 |
| 2006/0288119 | A1 * | 12/2006 | Kim et al. ..................... | 709/238 |
| 2007/0064702 | A1 * | 3/2007 | Bates et al. .................. | 370/392 |
| 2007/0127481 | A1 * | 6/2007 | Park et al. ..................... | 370/392 |

(Continued)

FOREIGN PATENT DOCUMENTS

| | | |
|---|---|---|
| JP | 2004-178472 A | 6/2004 |
| JP | 2004-341576 A | 12/2004 |

(Continued)

OTHER PUBLICATIONS

Office Action issued Apr. 3, 2012 by the Japanese Patent Office in counterpart Japanese Application No. 2008-022431.

(Continued)

*Primary Examiner* — Firmin Backer
*Assistant Examiner* — Natisha Cox
(74) *Attorney, Agent, or Firm* — Sughrue Mion, PLLC

(57) ABSTRACT

A system and method of providing quality of service (QoS)-enabled digital content in peer-to-peer (P2P) networks are provided. The QoS-enabled service system on the P2P network includes: a service provider capable of providing digital content; one or more user nodes receiving digital content from the service provider; one or more donor nodes lending resources for providing digital content; and a supernode receiving information on user nodes and donor nodes, and a copy of digital content from the service provider, allowing the exchange of digital content among the user nodes through P2P networking, and when at least one user node experiences a P2P networking error during the exchange of the digital content, arranging for a predetermined number of donor nodes from among the one or more donor nodes to join the P2P networking. According to the system and method, even when the function of a peer does not normally work on a P2P network, a donor as a replacement of the peer is utilized, thereby providing QoS-enabled digital content to a user requesting the digital content.

20 Claims, 7 Drawing Sheets

U.S. PATENT DOCUMENTS

| | | | |
|---|---|---|---|
| 2007/0198675 A1* | 8/2007 | Amanuddin et al. | 709/223 |
| 2008/0037499 A1* | 2/2008 | Kumar et al. | 370/342 |
| 2008/0080392 A1* | 4/2008 | Walsh et al. | 370/254 |
| 2008/0133767 A1* | 6/2008 | Birrer et al. | 709/231 |
| 2008/0144621 A1* | 6/2008 | Huang et al. | 370/390 |

FOREIGN PATENT DOCUMENTS

| | | |
|---|---|---|
| JP | 2004-341929 A | 12/2004 |
| JP | 2005-275539 A | 10/2005 |
| KR | 2000-0063991 A | 11/2000 |
| KR | 10-2001-0000483 A | 1/2001 |
| KR | 10-0655600 B1 | 12/2006 |

OTHER PUBLICATIONS

Notice of Allowance dated Oct. 10, 2011 issued by the Korean Intellectual Property Office in counterpart Korean Patent Application No. 10-2007-0020584.

Hefeeda, et al., "Promise: Peer-to-Peer Media Streaming Using CollectCast", ACM MM'03, Nov. 2, 2003, Berkeley, California, USA, pp. 45-54, 2003 ACM 1-58113-722-2/03/0011.

Communication dated Mar. 16, 2011 from the Korean Patent Office dated in counterpart Korean application No. 10-2007-0020584.

* cited by examiner

SYSTEM AND METHOD OF PROVIDING QUALITY OF SERVICE-ENABLED CONTENTS IN PEER-TO-PEER NETWORKS

CROSS-REFERENCE TO RELATED PATENT APPLICATIONS

This application claims the benefit of Korean Patent Application No. 10-2007-0020584, filed on Feb. 28, 2007, in the Korean Intellectual Property Office, the disclosure of which is incorporated herein in its entirety by reference.

BACKGROUND OF THE INVENTION

1. Field of the Invention

Systems and methods consistent with the present invention relate to a peer-to-peer (P2P) network, and more particularly, to of supporting quality of service (QoS)-enabled digital content in a P2P network.

2. Description of the Related Art

Peer-to-peer (P2P) is a technology which enables a computer of a person who is seeking information and a computer of a person who has the information to be connected directly without a server computer in-between on the Internet, thereby allowing the information to be shared, and a new service to be provided by applying the P2P technology. Unlike the conventional method requiring a search engine for finding information on the Internet, information can be received directly from any personal computer (PC) connected to the Internet, and in addition to searching downloading can even be performed.

P2P technology applies the concept of a local area network (LAN) to the Internet. If P2P technology is used, PC users can freely access each other's computers without a separate server or a fixed IP address (dedicated line), and exchange required data. Accordingly, ordinary PC users can directly exchange MP3 files or other computer files with each other without an intermediary, and in relation to Internet businesses, this P2P technology can be applied to a wide variety of fields.

A P2P network has an ad-hoc structure in which dispersed nodes communicate with each other without any central control, and each participating node can perform both a router role and a server role. The P2P network is applied to an environment that does not require continuous connection.

All nodes participating in a P2P network permit other nodes to access respective resources, thereby participating in the P2P network. Without a separate central management system, each node provides a cooperative service among participants.

File sharing is a representative type of P2P application service. A client node which downloads a file in a P2P environment also provides the file to other nodes, thereby also performing a server role. Providing presence information of nodes and resources in a P2P-based voluntary structural organization is a basic function of the P2P system. Thus, a node can directly communicate with other nodes and can send a query about a required resource.

As file sharing programs of a P2P system, Napster and Gnutella have been developed, followed by KaZaA which is now widely used. A characteristic of KaZaA is that after finding a plurality of users having identical files, the file is divided into smaller parts, and the smaller parts are downloaded at the same time from a plurality of places. For example, if the file is downloaded from three places, the download can be finished three times faster than downloading from one place.

Another characteristic of KaZaA is that searching is performed by using a supernode method. This can be regarded as a compromise between the Napster method in which searching is centrally performed, and the Gnutella method in which searching is performed in a completely distributed manner. Among users' computers, those computers with relatively larger capacities are selected and referred to as supernodes. In each supernode, the list of files shared by the users neighboring the supernode is stored. When a user begins searching, the user sends a search request to a supernode to which the user is connected, and then, the request is also transferred to other supernodes.

However, in this P2P network, the connection of each peer is dynamic, that is, according to user's circumstances, the related node may be irregularly disconnected from or connected to the network. Accordingly, if one node having a predetermined file is disconnected, a download plan of another node to obtain data from the disconnected node may fail. As a result, this transient characteristic of the P2P network cannot guarantee the data transmission performance, thereby making the operation of the network unpredictable. Accordingly, a service for providing QoS-enabled digital content may not be performed normally.

SUMMARY OF THE INVENTION

The present invention provides a QoS-enabled digital content service system and method of providing a high quality digital content service, by utilizing donor nodes.

According to an aspect of the present invention, there is provided a QoS-enabled service system on a P2P network including: a service provider capable of providing digital content; one or more user nodes receiving digital content from the service provider; one or more donor nodes lending resources for providing digital content; and a supernode receiving information on user nodes and donor nodes, and a copy of digital content from the service provider, allowing the exchange of digital content among the user nodes by P2P networking, and when at least one user node experiences a P2P networking error during the exchange of the digital content arrange for a predetermined number of donor nodes from among the one or more donor nodes to join the P2P networking.

The one or more user nodes may be peers belonging to a P2P networking group in a predetermined area, and may be capable of communication and file sharing with their respective communication protocols and communication applications.

Before obtaining digital content, the one or more user nodes may register in the service provider and provide their attributes to the service provider.

The one or more donor nodes may be peers having their respective communication and file sharing functions in a P2P network, may register in the service provider, and provide their attributes to the service provider.

The attributes may include information on a download and/or upload bandwidth, the physical location of a node, a convenient time for uploading, or information on whether or not a node exists behind a network address translation (NAT) device or a firewall.

The supernode may receive the attributes of the registered user nodes and donor nodes and a copy of digital content from the service provider.

Based on the attributes, the supernode may distribute the copy of the digital content to the user nodes in the P2P network group so that content information can be exchanged among the user nodes through P2P networking.

If a user node having some or all of the distributed digital content loses a P2P networking function, the supernode may contact all donor nodes, ask whether or not the donor node can provide resources, select a donor node having an appropriate bandwidth, and provide the content of the user node that lost the P2P networking function, to the selected donor node, thereby connecting the donor node to the P2P network.

While finding the donor node as the replacement of the user node which has lost the P2P networking function and arranging for the donor node to join the P2P networking, the supernode itself may perform the role as the replacement of the user node.

The supernode may be capable of selectively providing a method of providing QoS-enabled digital content and a method of providing QoS-non-enabled digital content to the user of the user node.

If the user node selects the method of providing QoS-enabled digital content, the supernode may utilize the donor node as the replacement of a user node which has lost the function, and if the user node selects the method of providing QoS-non-enabled digital content, the supernode may not utilize the donor node even when a user node loses the function.

When donor nodes provide resources as the replacement of a function-lost user node, the supernode may give predetermined credits to the donor nodes.

The credits may be given discriminatively according to stability, performance of the resources, and number of times the doner node provide the resources.

According to another aspect of the present invention, there is provided a method of providing a QoS-enabled digital content service on a P2P network, the method including: a user node which wants to obtain predetermined digital content, or a donor node intending to provide resources registering in a service provider providing digital content; the service node providing information on user nodes and donor nodes, and digital content to a supernode; the supernode distributing digital content to user nodes, and enabling the user nodes to share the digital content through P2P networking; and if an error occurs in the P2P networking state of any of the user nodes, the supernode detecting the error, and allowing a donor node provide digital content through P2P networking as a replacement of the user node.

In the registering in a service provider, the user node and donor node may provide attributes, including information on a download and/or upload bandwidth, the physical location of the node, a convenient time for uploading, or information on whether or not a node exists behind an NAT device or a firewall, to the service provider.

In the distributing performed by the supernode of the digital content to user nodes, and the enabling of the user nodes to share the digital content through P2P networking, based on the attributes, the supernode may distribute the copy of the digital content to the user nodes in the P2P network group so that content information can be exchanged among the user nodes by P2P networking.

The detecting of the occurrence of the error by the supernode and the allowing of the donor node to provide digital content through P2P networking as a replacement of the user node may include: if a user node having some or all of the distributed digital content loses a P2P networking function, the supernode contacting all donor nodes and asking whether or not the donor node can provide resources; according to the responses from all the donor nodes, the supernode selecting a donor node having an appropriate bandwidth, and providing the content of the function-lost user node that lost the P2P networking function, to the selected donor node; and the supernode making the donor node join the P2P network and provide the digital content.

While finding the donor node as the replacement of the user node which has lost the P2P networking function and arranging for the donor node to join the P2P networking, the supernode itself may performs the role as the replacement of the user node.

The method may further include, before sharing digital content among user nodes by P2P networking, the supernode making the user of the user node select one of a method of providing QoS-enabled digital content and a method of providing QoS-non-enabled digital content.

If the user node selects the method of providing QoS-enabled digital content, the supernode may utilize the donor node as the replacement of a user node which has lost the function, and if the user node selects the method of providing QoS-non-enabled digital content, the supernode may not utilize the donor node even when a user node loses the function.

When donor nodes provide resources as the replacement of a function-lost user node, the supernode may give predetermined credits to the donor nodes.

The credits may be given discriminatively according to stability, performance of the resources, and number of times the donor node provide the resources.

According to another aspect of the present invention, there is provided a method of downloading QoS-enabled digital content by P2P networking, including: before joining a P2P network, a user of a user node (peer) requesting a service provider having desired media content to provide the media content; the service provider receiving the request of the content informing a closest supernode of the request and providing information on the user node to the supernode; by considering peers joining in the P2P network and the size of the media content, the supernode informing the user node of an estimated time required for QoS-enabled download, and an estimated time required for QoS-non-enabled download; if the user selects the QoS-enabled download and while the P2P content downloading is performed, a network error occurs in one or more peers connected to the network, the supernode finding a donor node having appropriate and available replacement resources, and contacting the donor node; while the donor node and the current user node establish a connection, the supernode performing as the peer of the network, joining in the P2P networking as a replacement of the peer in which the error has occurred, and continuing the download of the content which the peer has, until the donor node begins to perform the function of the peer.

When donor nodes provide resources as the replacement of a function-lost user node, the supernode may give predetermined credits to the donor nodes.

The credits may be given discriminatively according to stability, performance of the resources, and number of times the donor nodes provide the resources.

According to another aspect of the present invention, there is provided a method of providing a QoS-enabled video streaming service by P2P networking, the method including: before streaming video data, a service provider which is to provide the video data, transmitting notices, including details of the video data to be broadcast, to all users; users who are interested in the video data from among the users receiving the notices, making reservations (registering) with the service provider, indicating that they will participate in the broadcasting in order to watch real-time video streaming, in which the participation of the broadcasting includes participation as a user node in order to watch the video data, and participation as a donor node in order to lend resources; transmitting information obtained from the users and a copy of the video content to be provided, to local supernodes; the supernodes providing the video content to user nodes in a distributed manner, and making the video content broadcast to the user nodes which have reserved the video content, through P2P network at a reserved time; and if QoS-enabled video streaming is requested, the supernodes monitoring the video content broadcast state and enabling seamless video streaming service, by utilizing a donor node as a replacement of a user node in which an error occurs.

When donor nodes provide resources as the replacement of a function-lost user node, the supernode may give predetermined credits to the donor nodes.

The credits may be given discriminatively according to stability, performance of the resources, and number of times the donor nodos provide the resources

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

The present invention will now be described more fully with reference to the accompanying drawings, in which exemplary embodiments of the invention are shown.

Figure 1:
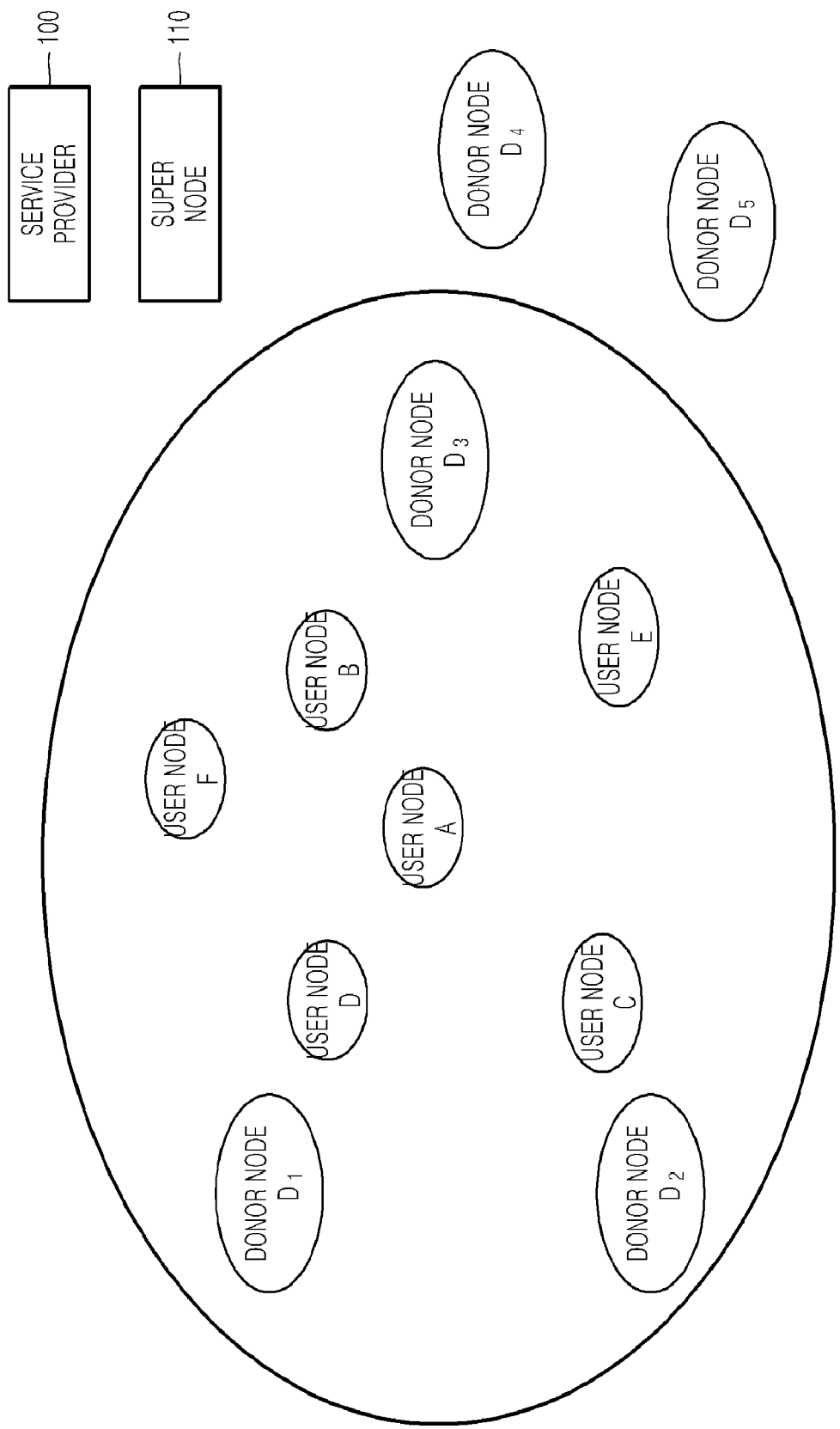
FIG. 1 is a schematic diagram illustrating an example of P2P network system providing QoS-enabled digital content in which digital content is downloaded or media streaming is performed according to an exemplary embodiment of the present invention.

FIG. 1 is a schematic diagram illustrating an example of a P2P network system providing QoS-enabled digital content in which digital content is downloaded or media streaming is performed according to an exemplary embodiment of the present invention.

The system includes a service provider 100, user nodes A through E, donor nodes D1 through D5, and a supernode 110.

The service provider 100 has digital content and can provide a free or charged digital content service. An example of the service provider 100 may be a content server of a Disney company having a variety of movie and animation content files.

The user nodes A through E are peers belonging to a P2P networking group in a predetermined area, and have predetermined communication protocols and communication applications, by which a user node in the network can communicate with and share files with other nodes in the network. In FIG. 1, the user nodes A through E connected to and communicating with each other are nodes that can exchange digital content provided by the service provider 100 using P2P technology.

The user nodes A through E should access the service provider 100 and register their attributes before obtaining digital content.

The donor nodes D1 through D5 are peers belonging or not belonging to the P2P networking group, and like the user nodes, have communication and file sharing functions in the network. As replacements of one or more user nodes that have lost their functions during P2P networking, donor nodes provide their resources, thereby allowing other user nodes to utilize digital content of the user nodes which have failed.

The donor nodes D1 through D5 should also provide their attributes to the service provider 100 and register the attributes.

When registering the attributes, the user nodes A through E or the donor nodes D1 through D5 should provide their attributes to the service provider 100. The attributes may be, for example, information on a download and/or upload bandwidth, the physical location of a node, a convenient time for uploading, or information on whether or not a node exists behind an NAT device or a firewall. Each user node has a unique token identifier (ID) that can be used for billing or other transactions. By using this token ID, the anonymity of peers can be guaranteed, an essential feature of a P2P network.

The supernode 110 receives attributes and digital content of the registered user nodes A through E and registered donor nodes D1 through D5 from the service provider 100. Based on this information, the supernode 110 distributes digital content to the user nodes A through E, and keeps information on the digital content and related information on the user nodes A through E.

Also, when a user node having a part or all of the distributed digital content loses a P2P networking function by, for example, a random turn-off, the supernode 110 can select a donor node which will be connected to the P2P network and provide the digital content as a replacement of the user node. After receiving required digital content from the supernode 110, the selected donor node can join the P2P networking, thereby downloading and uploading digital content together with other user nodes A through E.

The supernode 110 can selectively provide a method of providing QoS-enabled digital content and a method of providing QoS-non-enabled digital content so that a user node which wants to obtain the digital content can select one of the methods. If the method of providing QoS-non-enabled digital content is selected, then, in the process in which the user node obtaining the digital content by using P2P networking, even when the networking function of another user node having part of its digital content lost, the supernode 110 does not need to replace the other user node with a donor node. Meanwhile, if the method of providing QoS-enabled digital content is selected, then, when the networking functions of some user nodes which are P2P networked are lost, the supernode 110 substitutes donor nodes for the content providing functions of the user nodes.

When the donor nodes D1 through D5 provide resources instead of the user nodes which have lost their functions, the supernode 110 gives predetermined points or credits to the donor nodes D1 through D5. The credits may be given discriminatively according to the stability, performance, and number of times the donor nodes provide the resources. Thus given credits may be used later as necessary expenses when the donor nodes are changed to user nodes and an attempt is made to obtain predetermined digital content, or may be used as a means allowing QoS-enabled digital content to be provided.

When a donor violates a resource providing contract (for example, through system turn-off), or when the promised resources and performance are not provided, the credits may be cut down.

Figure 2:
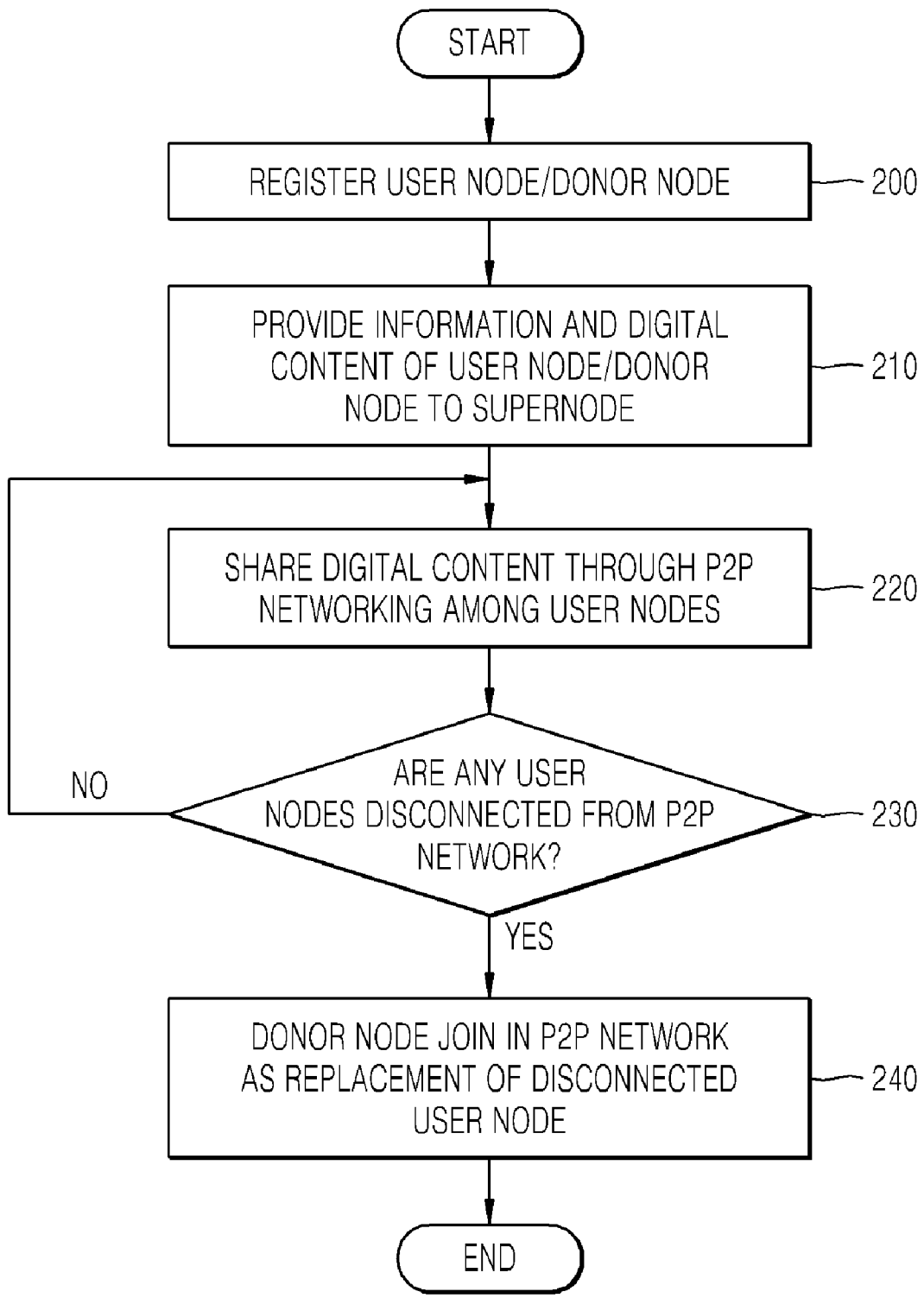
FIG. 2 is a flowchart illustrating a method of providing a QoS-enabled service according to an exemplary embodiment of the present invention.

FIG. 2 is a flowchart illustrating a method of providing a QoS-enabled service according to an exemplary embodiment of the present invention.

First, user nodes A through E of users who want to obtain predetermined digital content register as user nodes in the service provider 100 having the digital content, or donor nodes D1 through D5 intending to provide resources register as donor nodes in the service provider 100. When a node registers as a user node or a donor node, the node should provide its attributes to the service provider 100.

In operation 210, the service provider 100 provides the attributes of the user nodes A through E and the donor nodes D1 through D5, and the digital content to be provided, to the supernode 110 which is located closest to the user nodes A through E. If the supernode 100 already has the digital content, providing of the digital content in this operation can be omitted.

By applying predetermined methods known to those of ordinary skill in the art pertaining to the present invention, the supernode 110 distributes the digital content to the user nodes A through E, and stores information on the user nodes, including attributes, and information on the donor nodes.

By performing P2P communication among the user nodes A through E having distributed digital content, download and/or upload of the digital content are performed in operation 220.

Some of the user nodes A through E may be disconnected from the P2P networking due to random turn-off or the like, and therefore the supernode 110 checks for any disconnections in operation 230. If such a disconnection occurs, in order to guarantee QoS, the supernode 110 contacts donor nodes in a donor node list, finds a donor node(s) capable of providing appropriate resources, distributes the digital content distributed to the disconnected user nodes, to the donor nodes, and makes the donor node(s) participate in the P2P networking in operation 240. In particular, the resources may be the bandwidth of the donor node(s), and in this case, available time information of the resources may also be provided to the supernode 110.

Operation 240 may or may not be performed according to whether an option of selecting a QoS service method, which is provided by the supernode 110 to a user node that wants to use digital content, is selected by the user of the user node. That is, if the user node selects the QoS-enabled service method, then, in order to guarantee, seamless transmission of the digital content, the supernode 110 performs operation 240. If the user node does not select the QoS-enabled service method, the supernode 110 does not perform operation 240, and waits until the disconnected user nodes return to the network, or a new user node having the digital content is connected to the network.

Figure 3:
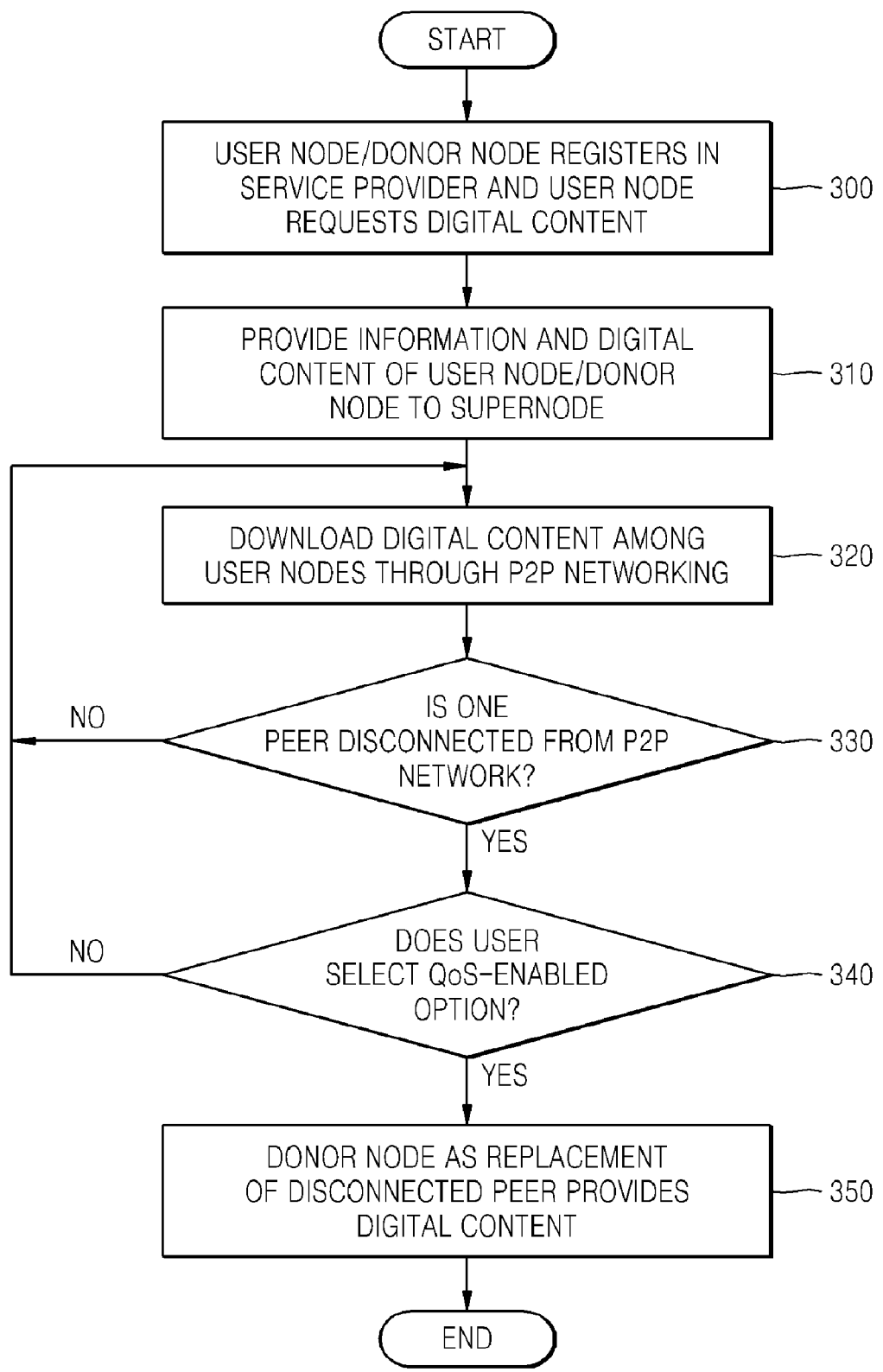
FIG. 3 is a flowchart illustrating a method of downloading media content in a P2P network according to an exemplary embodiment of the present invention.

FIG. 3 is a flowchart illustrating a method of downloading media content in a P2P network according to an exemplary embodiment of the present invention.

Before joining a P2P network, a user of a peer (user node) capable of P2P networking registers with a service provider having a desired media content file, informs the service provider that the user will request the digital content as a user node or will provide resources as a donor node, and provides information on the user to the service provider in operation 300.

The service provider informs the closest supernode of this, and provides information on the user node and donor nodes, including attributes, to the supernode in operation 310. The supernode may have already received the digital content requested by the user from the service provider and kept the digital content, or may newly receive the digital content.

The supernode makes user nodes exchange digital content by P2P networking in operation 320. The supernode may calculate an estimated time required for downloading the media content file according to the attributes of user nodes (peers) joining the current P2P network, and may inform the user (node) of the calculation result together with QoS-enabled option information. In this case, information on details of credits of the user, and additionally required credits for downloading the digital content may be further provided.

For example, when the user wants to download a 5-gigabyte content file according to a QoS-enabled method, a required time may be 60 minutes and the required credits may be 2 points. This is enabled because the supernode can distribute the digital content, by appropriately using donor nodes for fast downloading of the digital content.

In this example, if the user does not select the QoS-enabled method and wants to download the 5-gigabyte content file according to an ordinary method, the credits may not be needed at all, but the time required for downloading the digital content may be 8 hours or more. This may be because of the small number of user nodes which are connected to the P2P network and they provide the digital content in a distributed manner, or because of unstable resource usage states of the connected user nodes.

If the user selects the QoS-enabled option in operation 340, the supernode provides the user with seamless media content downloading for which a predetermined required time is guaranteed, by utilizing donor nodes in operation 350. That is, if any one or more peers connected to the network experience unexpected network errors or are turned off in operation 330, the supernode finds a donor node which has appropriate and available replacement resources, from a list of donor nodes, and makes the donor node provide the digital content instead of the peers disconnected from the network in operation 350.

If the user does not select the QoS-enabled option in operation 340, the supernode allows downloading to be performed only from among user nodes in operation 320.

While the donor node and the current user node establish a connection, the supernode may operate as a peer of the network, thereby continuing to download the digital content contained in the turned-off peer.

If the donor node replaces the turned-off peer, the supernode finishes the P2P network connection.

Figure 4:
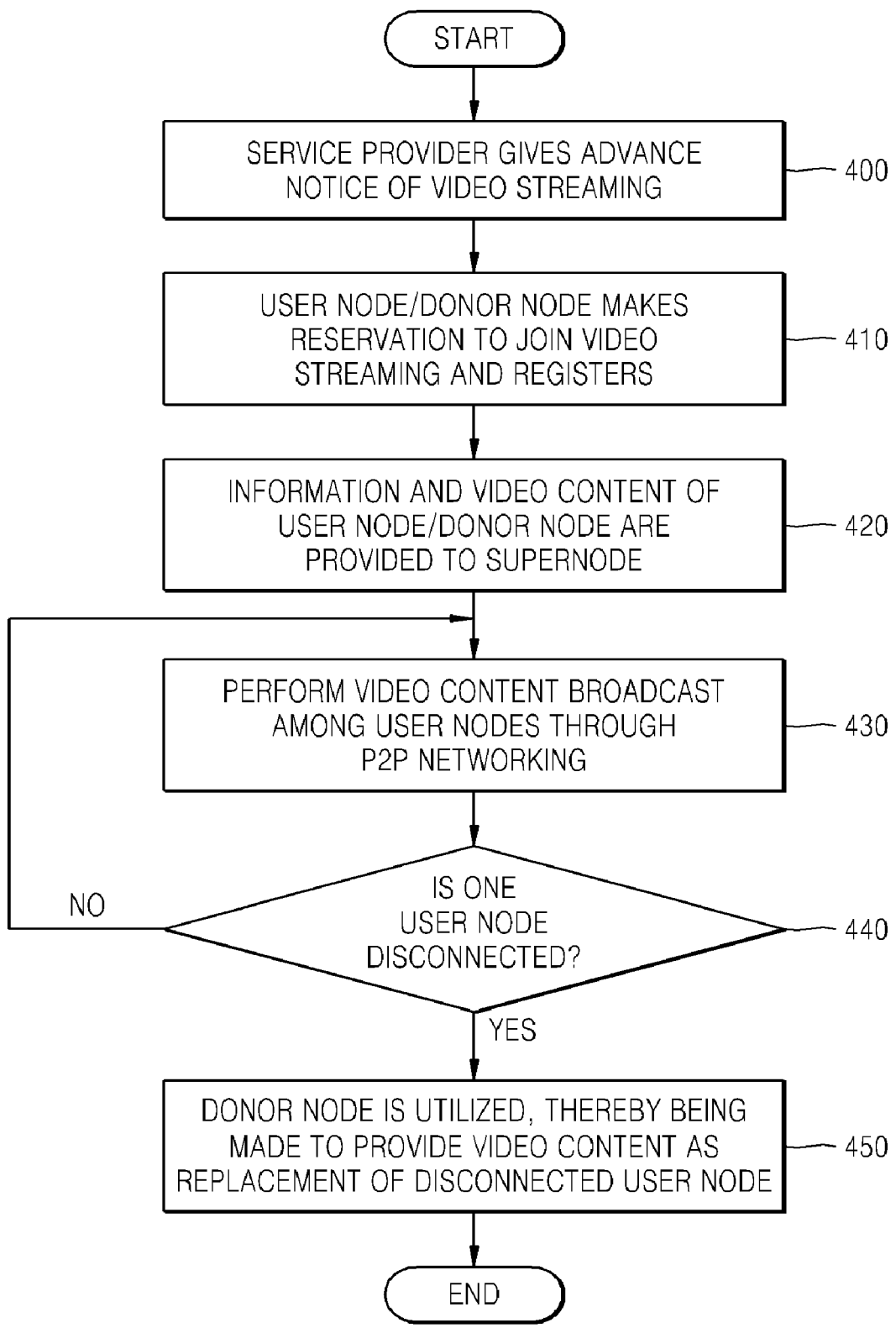
FIG. 4 is a flowchart illustrating a method of receiving a video streaming service in a P2P network according to an exemplary embodiment of the present invention.

FIG. 4 is a flowchart illustrating a method of receiving a video streaming service in a P2P network according to an exemplary embodiment of the present invention.

Before streaming video data, a service provider which is to provide the video data sends notices including details of the video data to be broadcast, to all users in operation 400. The details may include a time and date for streaming the video data and other metadata.

Among the users receiving the notices, those who are interested in the video data may make reservations with the service provider, indicating that they will join the broadcasting in order to receive real-time video streaming in operation 410. In this case, the user node of each user may provide the attributes, as described above, and informs whether the user wants to watch the video or to perform the role of a donor node.

Information obtained from the users and copies of the video content to be serviced are transmitted to local supernodes in operation 420.

The supernodes may further inform the users of details of credits and how many more credits are further required in order to download the video content.

The supernodes provide the video content to user nodes in a distributed manner, and allow the video content to be broadcast to the user nodes which have reserved the video content service, through a P2P network at a reserved time in operation 430.

When QoS-enabled video streaming is requested, the supernodes monitor the video content broadcast state in operation 440, and enables a seamless video streaming service, by utilizing a donor node as a replacement of a user node in which an error occurs in operation 450. These operations may be replaced by operations 360 through 390 illustrated in FIG. 3.

Figure 5A:
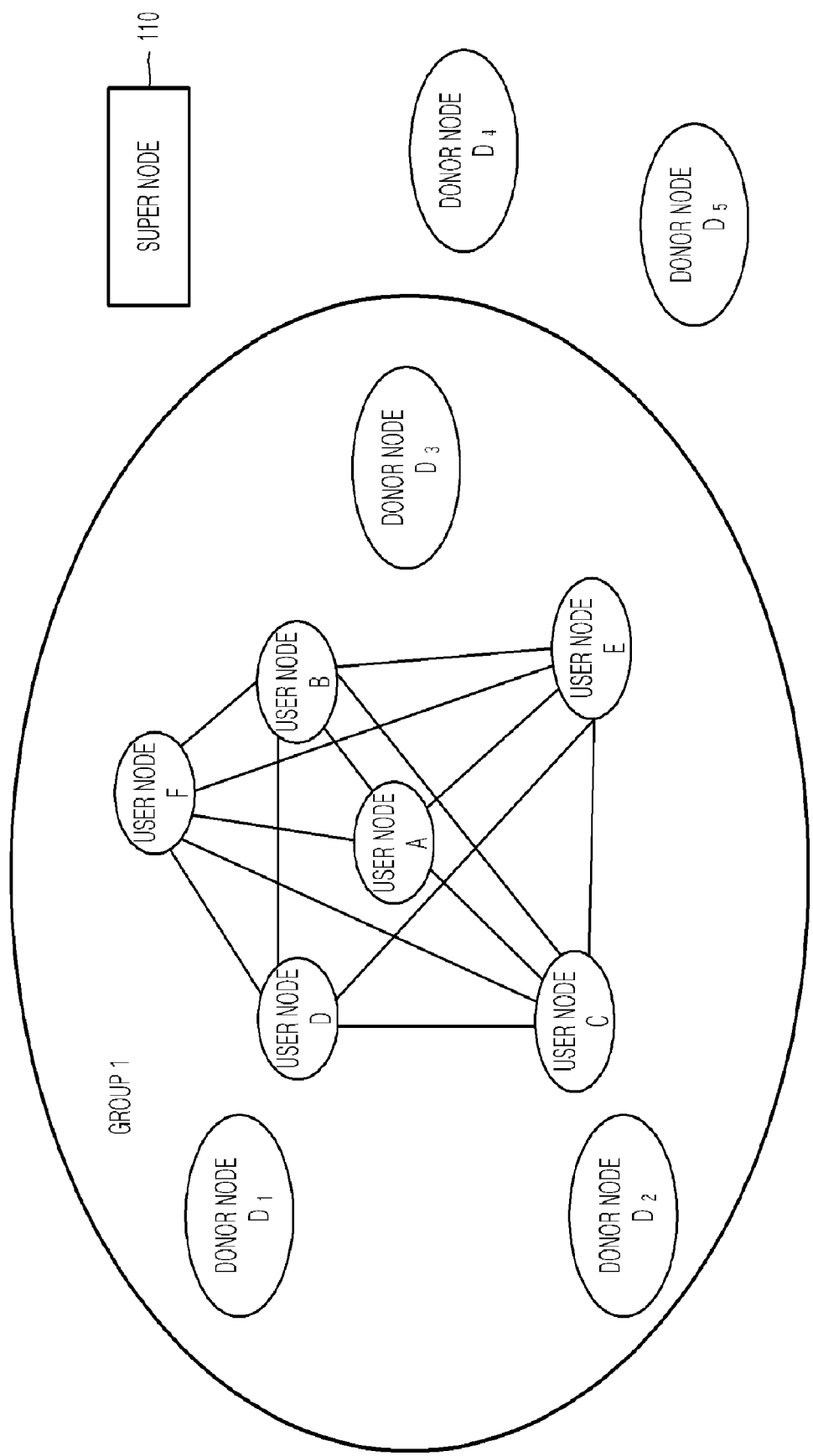
FIG. 5A is a diagram illustrating a state of a content providing system using P2P networking, in which digital content is normally shared by user nodes A through E, to which digital content is distributed, according to an exemplary embodiment of the present invention.
Figure 5B:
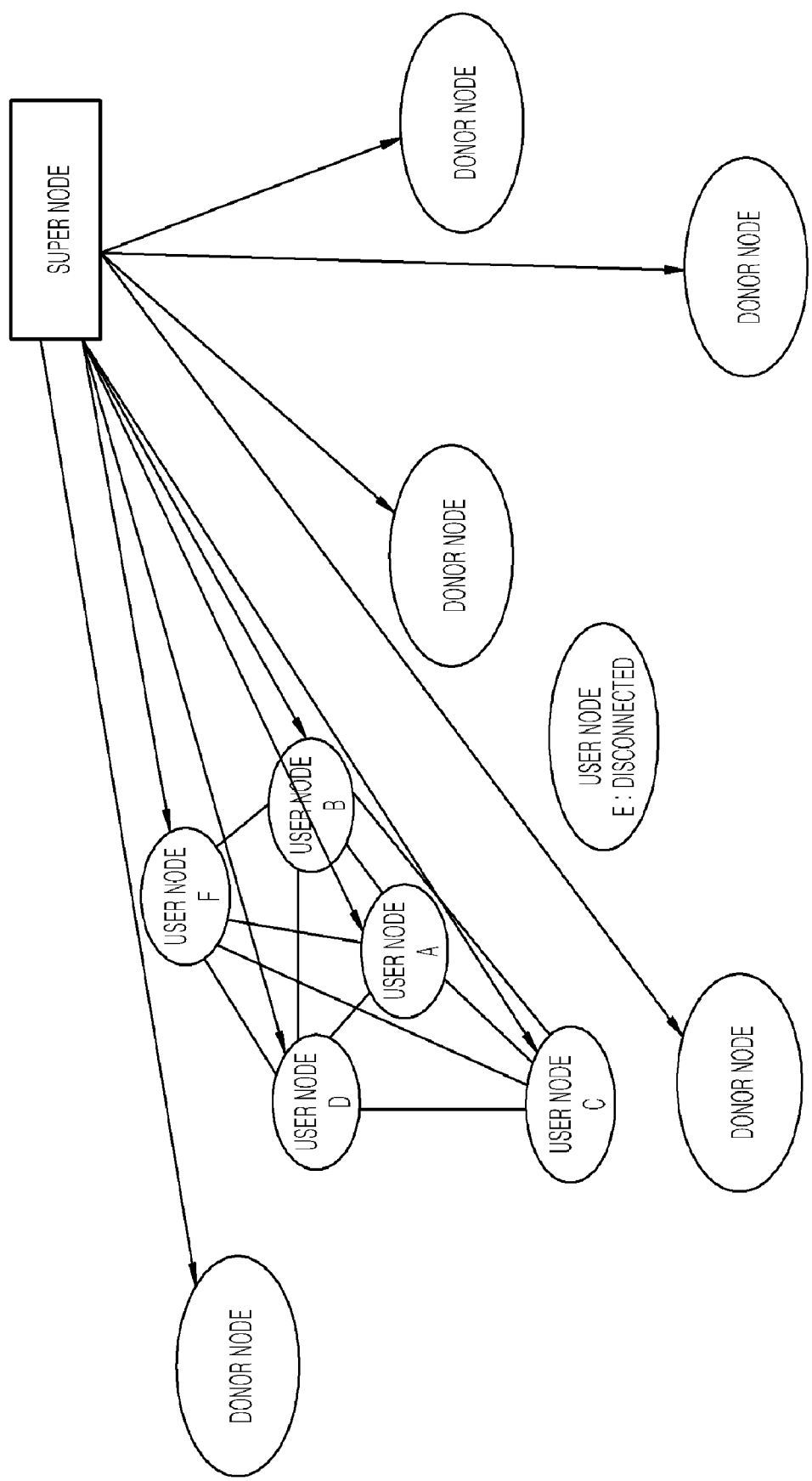
FIG. 5B is a diagram illustrating a state of a P2P networking system when a networking error occurs in a user node according to an exemplary embodiment of the present invention.
Figure 5C:
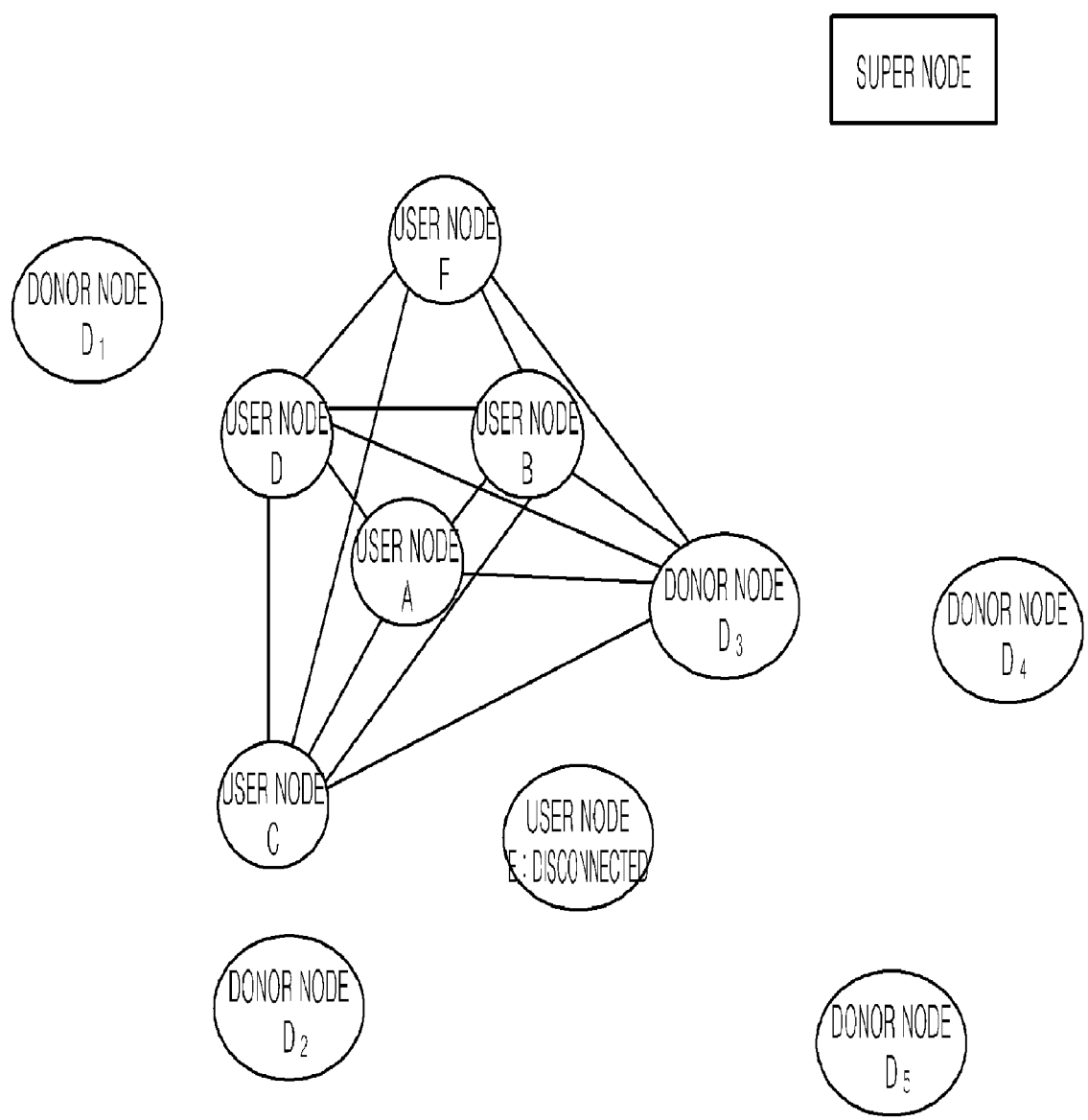
FIG. 5C is a diagram illustrating a state of a P2P networking system in which a donor node is selected by a supernode and acts as the replacement of a user node, providing digital content according to an exemplary embodiment of the present invention.

FIGS. 5A through 5C illustrate a P2P network system in which QoS-enabled digital content according to the present invention is transmitted. FIG. 5A illustrates a state in which digital content is normally shared by user nodes A through E, to which digital content is distributed. FIG. 5B illustrates a state in which, when a networking error occurs in a user node E, a supernode 110 continuously provides digital content instead of the user node E, to user nodes A through D, and F, and at the same time, contacts donor nodes D1 through D5. FIG. 5C illustrates a state in which the donor node D3 is selected by the supernode 110 and, the donor node D3 acts as the replacement of the user node E, providing digital content.

According to the present invention, even when the function of a peer does not normally work on a P2P network, a donor as a replacement of the peer is utilized, thereby providing QoS-enabled digital content to a user requesting the digital content.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A quality-of-service (QoS)-enabled service system on a peer-to-peer (P2P) network, the system comprising:
a service provider which provides digital content;
a plurality of user nodes which receive the digital content from the service provider;
one or more donor nodes which lend resources for providing the digital content; and
a supernode which receives information on the user nodes and the donor nodes, and a copy of digital content from the service provider, allows exchange of digital content among the user nodes by P2P networking, and if at least one user node experiences a P2P networking error during the exchange of the digital content,
wherein the supernode is capable of selectively providing a method of providing QoS-enabled digital content and a method of providing QoS-non-enabled digital content to the user of the user node, wherein the supernode provides QoS-enabled digital content by arranging for at least one donor node from among the one or more donor nodes to join the P2P networking, and
wherein the supernode provides QoS-non-enabled content by waiting until the user node which experienced the networking error returns to the network or a new user having the digital content is connected to the network.

2. The system of claim 1, wherein the user nodes are peers belonging to a P2P networking group in a predetermined area, and are capable of communication and file sharing.

3. The system of claim 1, wherein before obtaining digital content, the user nodes register with the service provider and provide their attributes to the service provider.

4. The system of claim 3, wherein the one or more donor nodes are peers having their respective communication and file sharing functions in a P2P network, register with the service provider, and provide their attributes to the service provider.

5. The system of claim 3, wherein the attributes include information on at least one of a download and upload bandwidth, the physical location of a node, a convenient time for uploading, or information on whether a node exists behind a network address translation device or a firewall.

6. The system of claim 4, wherein the supernode receives the attributes of the registered user nodes and the registered donor nodes and a copy of digital content from the service provider.

7. The system of claim 6, wherein based on the attributes, the supernode distributes the copy of the digital content to the user nodes in the P2P network group so that content information can be exchanged among the user nodes through P2P networking.

8. The system of claim 7, wherein if a user node having some or all of the distributed digital content loses a P2P networking function, the supernode contacts all donor nodes, inquires whether the donor nodes can provide resources, selects a donor node having an appropriate bandwidth, and provides the content of the user node that lost the P2P networking function, to the selected donor node, thereby connecting the donor node to the P2P network.

9. The system of claim 1, wherein while finding the at least one donor node to join the P2P networking as a replacement of the user node which has lost the P2P networking function and arranging for the at least one donor node to join the P2P networking, the supernode itself performs the role as the replacement of the user node.

10. The system of claim 1, wherein if the at least one user node selects the method of providing QoS-enabled digital content, the supernode utilizes the one or more donor nodes to join the P2P networking as a replacement of a user node which has lost the function, and if the user node selects the method of providing QoS-non-enabled digital content, the supernode does not utilize the at least one donor node even when the user node loses the function.

11. The system of claim 1, wherein when donor nodes provide resources as the replacement, the supernode gives predetermined credits to the donor nodes.

12. The system of claim 11, wherein the credits are given discriminatively according to stability, performance of the resources, and number of times the donor nodes provide the resources.

13. A method of providing a Quality of Service (QoS)-enabled digital content service on a P2P network, the method comprising:

a plurality of user nodes, and one or more donor nodes registering with a service provider providing digital content;

the service provider providing information on the user nodes and the donor nodes, and digital content to a supernode;

the supernode distributing digital content to user nodes, and enabling the user nodes to share the digital content through peer-to-peer (P2P) networking;

before sharing digital content among the user nodes by P2P networking, the supernode requesting the user node to select one of a method of providing QoS-enabled digital content and a method of providing QoS-non-enabled digital content;

if an error occurs in the P2P networking state of one of the user nodes, the supernode detecting the error, and wherein QoS-enabled content is provided by arranging for a donor node to provide digital content through P2P networking as a replacement of the user node; and wherein the QoS-non-enabled content is provided by waiting until the user node which experienced the error returns to the network or a new user having the digital content is connected to the network.

14. The method of claim 13, wherein in the registering with a service provider, the user nodes and the one or more donor nodes provide attributes, including information on a download or upload bandwidth, a physical location of the nodes, a convenient time for uploading, or on whether a node exists behind a network address translation device or a firewall, to the service provider.

15. The method of claim 13, wherein in the distributing performed by: the supernode of the digital content to user nodes, and the enabling of the user nodes to share the digital content through P2P networking based on the attributes, the supernode distributes the copy of the digital content to the user nodes in the P2P network group so that content information can be exchanged among the user nodes by P2P networking.

16. The method of claim 15, wherein the detecting of the occurrence of the error by the supernode and the arranging of the donor node to provide digital content through P2P networking as the replacement of the user node comprises: if a user node having some or all of the distributed digital content loses a P2P networking function, the supernode contacting all donor nodes and inquiring whether the donor nodes can provide resources; according to responses from the donor nodes, the supernode selecting a donor node having an appropriate bandwidth, and providing the content of the user node that lost the P2P networking function, to the selected donor node; and the supernode making the selected donor node join the P2P network and provide the digital content.

17. The method of claim 16, wherein while finding the donor node as the replacement of the user node which has lost the P2P networking function and arranging for the donor node to join the P2P networking, the supernode itself performs the role as the replacement of the user node.

18. The method of claim 13, wherein if the user node selects the method of providing QoS-enabled digital content, the supernode utilizes the donor node as the replacement of the user node which has lost the function, and if the user node selects the method of providing QoS-non-enabled digital content, the supernode does not utilize the donor node even when a user node loses the function.

19. The method of claim 13, wherein when donor node provides resources as the replacement of a user node, the supernode gives predetermined credit to the donor node.

20. The method of claim 19, wherein the credit is given discriminatively according to stability, performance of the resources, and number of times the donor node provides resources.

\* \* \* \* \*